US006959014B2

(12) United States Patent
Pohlmeyer et al.

(10) Patent No.: US 6,959,014 B2
(45) Date of Patent: Oct. 25, 2005

(54) METHOD AND APPARATUS FOR OPERATING A COMMUNICATION BUS

(75) Inventors: Aldan J. Pohlmeyer, Ypsilanti, MI (US); Michel Burri, Grand-Saconnex (CH); Steven B. McAslan, Glasgow (GB); Will Specks, Munich (DE); Matthew B. Ruff, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 987 days.

(21) Appl. No.: 09/773,806

(22) Filed: Feb. 1, 2001

(65) Prior Publication Data

US 2002/0101884 A1    Aug. 1, 2002

(51) Int. Cl.[7] ............................................. H04J 3/06
(52) U.S. Cl. .................. 370/514; 370/510; 370/512; 370/509; 370/507; 370/503
(58) Field of Search ............................ 370/355, 503, 370/512, 272, 509, 507, 510, 514; 710/100; 375/354–357

(56) References Cited

U.S. PATENT DOCUMENTS 5,517,505 A * 5/1996 Buchholz et al. ........... 370/350
5,892,927 A * 4/1999 Boehmer et al. ........... 710/100
6,771,611 B1 * 8/2004 Garg ........................... 370/272
6,868,093 B1 * 3/2005 Bohm et al. ................ 370/506
2003/0189954 A1 * 10/2003 Miki et al. .................. 370/509

* cited by examiner

Primary Examiner—Seema S. Rao
Assistant Examiner—Jay P. Patel
(74) Attorney, Agent, or Firm—Joanna G. Chiu; Susan C. Hill

(57) ABSTRACT

Embodiments of the present invention related generally to communication systems. One embodiment contemplates a method for operating a communication bus where the method includes detecting a start of frame symbol on the communication bus; determining a length of the start of frame symbol; detecting a start of a synchronization field on the communication bus; determining a length of an adjusted synchronization field; determining if the length of the adjusted synchronization field is less than the length of the start of frame symbol; and if the length of the adjusted synchronization field is less than the length of the start of frame symbol, concluding that the start of frame symbol is valid and concluding that the synchronization field is valid. Embodiments of the invention may be used, for example, with the Local Interconnect Network (LIN) protocol.

21 Claims, 5 Drawing Sheets

METHOD AND APPARATUS FOR OPERATING A COMMUNICATION BUS

FIELD OF THE INVENTION

The present invention relates generally to communication systems and more specifically to operation of a serial communication bus.

RELATED ART

One communication protocol publicly known in the art today is the Local Interconnect Network (LIN) protocol. This protocol is a universal asynchronous receive transmit (UART)/serial communication interface (SCI)-based communication protocol. The LIN protocol is a master/slave protocol that utilizes standard UART/SCI non-return to zero (NRZ) signaling. This is a serial character-oriented protocol where data characters include one start bit, eight data bits, one stop bit, and no parity, and data is transmitted least significant bit first. In such a character-oriented protocol, all bits are transmitted having a same bit time-length. Therefore, it would be desirable to develop methods of operating serial communication buses, including, for example, automatic baud-rate detection and synchronization of slave nodes, in accordance with protocols such as the LIN communication protocol.

BRIEF DESCRIPTION OF THE DRAWINGS

The present invention is illustrated by way of example and not by limitation in the accompanying figures, in which like references indicate similar elements, and in which.

Figure 1:
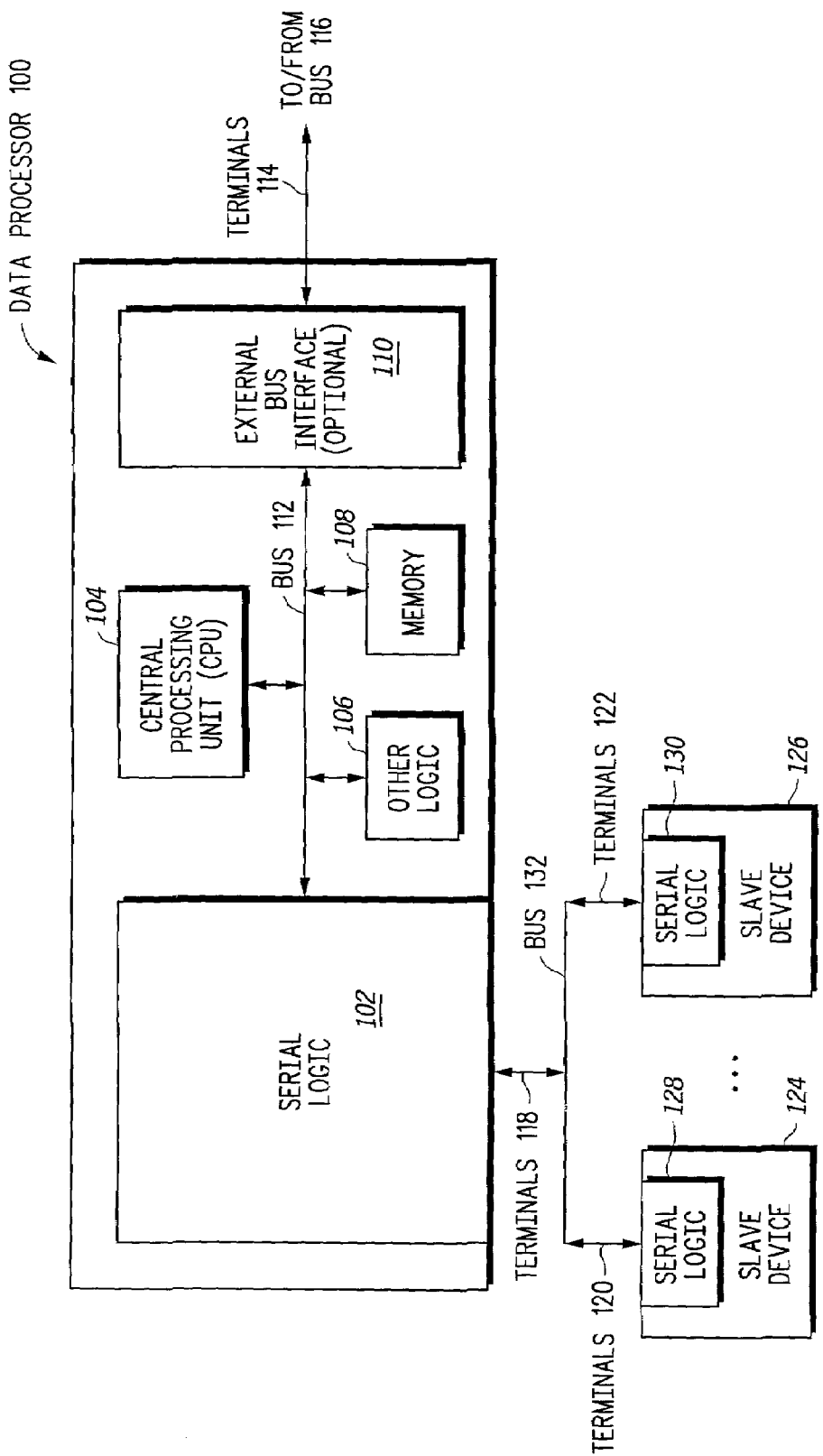
FIG. 1 illustrates, in block diagram form, a data processing system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The terms "assert" and "negate" are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Brackets are used to indicate the conductors of a bus or the bit locations of a value. For example, "bus 60 [0–7]" or "conductors [0–7] of bus 60" indicates the eight lower order conductors of bus 60, and "address bits [0–7]" or "ADDRESS [0–7]" indicates the eight lower order bits of an address value. The symbol "$" preceding a number indicates that the number is represented in its hexadecimal or base sixteen form. The symbol "%" preceding a number indicates that the number is represented in its binary or base two form.

As discussed above, the LIN is a UART/SCI-based communication protocol. The current LIN specification defines a physical layer interface which is located at each terminal of the line drivers and receivers within a LIN communication system. The LIN specification defines the slew rate tolerances and level shifting ranges for the physical layer interfaces. Therefore, the physical layer interface performs both wave shaping and level shifting. One embodiment of a physical layer interface is based on an enhanced ISO 9141 standard single wire bus. In this embodiment, the physical layer interface receives digital logic voltage levels and level shifts these to the battery voltage (Vbatt) levels of the communication system. For example, in one embodiment, the logic levels may range from 0–5 volts, and the physical layer interface would level shift the range of 0–5 volts to a range of 0-Vbatt volts. In one embodiment, such as in an automotive application, Vbatt may be 12 volts. Also, in the current embodiment, the physical layer interface actively drives the communication bus low (i.e. to 0 volts) upon receiving a logic-level zero, and releases the communication bus upon receiving a high signal (i.e. a logic-level one) or when returning the bus to an idle state. Therefore, upon releasing the communication bus, the communication bus returns to Vbatt. (Note that the communication bus also idles at Vbatt.) Since the communication bus is passively pulled up and not actively driven to Vbatt, an RC time constant is introduced at the rising edges thus resulting in different slew rates between the rising and falling edges of the signals transmitted over the communication bus.

The LIN specification also defines the signal specifications at both the driver and receiver nodes. For example, at the receiver node, the rising edges of the signal become defined upon reaching 60% of Vbatt, and the falling edges become defined upon reaching 40% of Vbatt. Therefore, due to the variances in slew rate of the rising and falling edges and to the 60% /40% voltage levels required at the receiver node, the physical layer interface may introduce errors or faults into the transmissions between nodes.

FIG. 1 illustrates a data processor 100 bidirectionally coupled to slave devices 124 and 126 via bus 132. Data processor 100 includes serial logic 102 coupled to central processing unit 104, other logic 106, memory 108, and external bus interface (optional) 110. The optional external bus interface 110 may be coupled to and from a system bus 116 via terminals 114. Data processor 100 is also bidirectionally coupled via terminals 118 to bus 132. Slave device 124 includes serial logic 128 and is bidirectionally coupled to bus 132 via terminals 120. Slave device 126 includes serial logic 130 and is bidirectionally coupled to bus 132 via terminals 122.

Data processor 100 and slave devices 124 and 126 may be any microcontroller, microprocessor, or the like, capable of transmitting/receiving serial data. One of ordinary skill in the art would understand that the serial logic found in each may include random logic, state machines, or embedded software for transmitting, receiving, or processing data.

Also, data processor 100 may be coupled to any number of slave devices. (FIG. 1 illustrates two slave devices as an example.) Data processor 100 may also include other logic 106 for performing a variety of other functions, as can be understood by those skilled in the art. Data processor 100 may include a variety of different memory blocks, depending on the needs of the system, and may optionally not have an external bus interface. In some embodiments, each of data processor 100 and slave devices 124 and 126 may operate as either a master or slave device depending on the action being performed. In one embodiment, data processor 100 may be a master device operating in accordance with the LIN protocol, sending serial information via a LIN communication bus 132 to slave devices 124 and 126. In this embodiment, terminals 118, 120, and 122 may each include a physical layer interface, as discussed above, and which may be defined by the LIN specification. The following discussions of FIGS. 3–6 will continue to assume the use of the LIN protocol for illustration purposes. That is, data processor 100 may be referred to as master 100 and bus 132 may be referred to as LIN bus 132.

Figure 2:
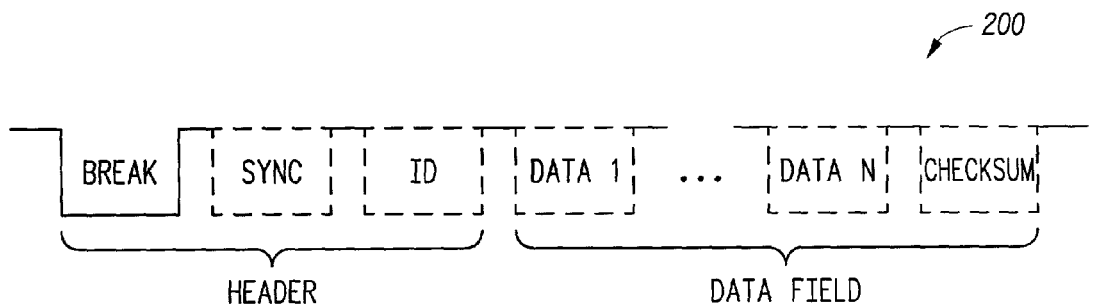
FIG. 2 illustrates a communication frame in accordance with one embodiment of the present invention.

FIG. 2 illustrates the format of a LIN frame which utilizes a header having a break character and a synchronization (sync) character. The break and synchronization characters form a break/sync pair which allows detection of the beginning of each frame on the bus. The LIN frame is transmitted by master 100 over LIN bus 132 to slave devices 124 and 126. The break character violates the standard character definition defined by the LIN specification as one start bit, 8 data bits, and 1 stop bit, thus providing a unique start of frame symbol. Therefore, the break character may also be referred to as a start of frame (SOF) symbol. Currently, the LIN specification defines the break character as having 13 or more dominant zero bits. That is, the LIN bus must be low (e.g. at zero) for the duration of at least 13 bits. This violates the standard 10 bit character definition. A possible enhancement to the LIN specification or other communication protocols may define the break character as having 10 or more dominant zero bits. This still violates the standard character definition and provides a unique SOF symbol, because within the standard character definition, the stop bit is always high. Thus, a series of 10 dominant zero bits (indicating an SOF symbol) can be differentiated from a $00 character because a $00 character includes a series of 9 zero bits followed by a high bit (at Vbatt). The use of 10 or more dominant zero bits also allows the use of standard communication hardware available today and can simplify software implementations for transmitting messages. Alternate embodiments may require different break character definitions depending on the standard character definition used by a given communication protocol.

The synchronization character, also referred to as the sync character, is defined by the LIN specification as a $55 byte. This $55 byte provides the maximum number of rising and falling edges from which bit timing information can be extracted (note that $55=%01010101, and is transmitted least significant bit first). This information is then used to determine the baud-rate that is being transmitted by the master node. Upon detection of a valid SOF symbol followed by a valid synchronization character, the slave device, such as slave device 124 or 126, receives an ID followed by a data field. The data field, as illustrated in FIG. 2, includes data values, such as data1 through dataN, and a checksum value. Therefore, in order to properly receive messages transmitted by a master, a slave should be able to detect the break/sync pair.

The embodiments described further below in reference to FIGS. 3–6 utilize the break/sync pair to achieve synchronization and automatic baud-rate detection from the LIN frame by slave nodes such as slave devices 124 and 126. Further, the embodiments described below allow slave devices 124 and 126 to utilize RC oscillators rather than requiring more costly crystal oscillators to perform both automatic baud-rate detection and frame synchronization. However, the use of RC oscillators by the slave devices introduce additional clock error. The LIN specification defines the maximum clock tolerance as +/−15%. However, other communication systems may allow for even greater clock tolerances. Thus, the methods described below allow for the use of slave devices utilizing RC oscillators while maintaining accurate transmissions.

The methods described herein also allow for the slave devices to have no prior knowledge of the baud-rate prior to receiving transmissions. Therefore, this allows for a standardized part to be used within many different LIN communication systems. Furthermore, since the slave device requires no prior knowledge, no extra memory is required to store specific RC oscillator values that are directed towards a specific baud-rate. For example, trimming values are generally calculated and stored at a part's production time to tighten the RC oscillator tolerance to within an allowed tolerance value, such as the +/−15% defined by LIN. The elimination of the RC trimming values therefore reduces manufacturing costs by reducing a part's production time. Cost can therefore be saved by eliminating the need to trim the RC oscillator, by allowing the use of standard parts in a variety of different LIN communication systems, and by eliminating the need for more expensive crystal oscillators within the slave nodes.

Figure 3:
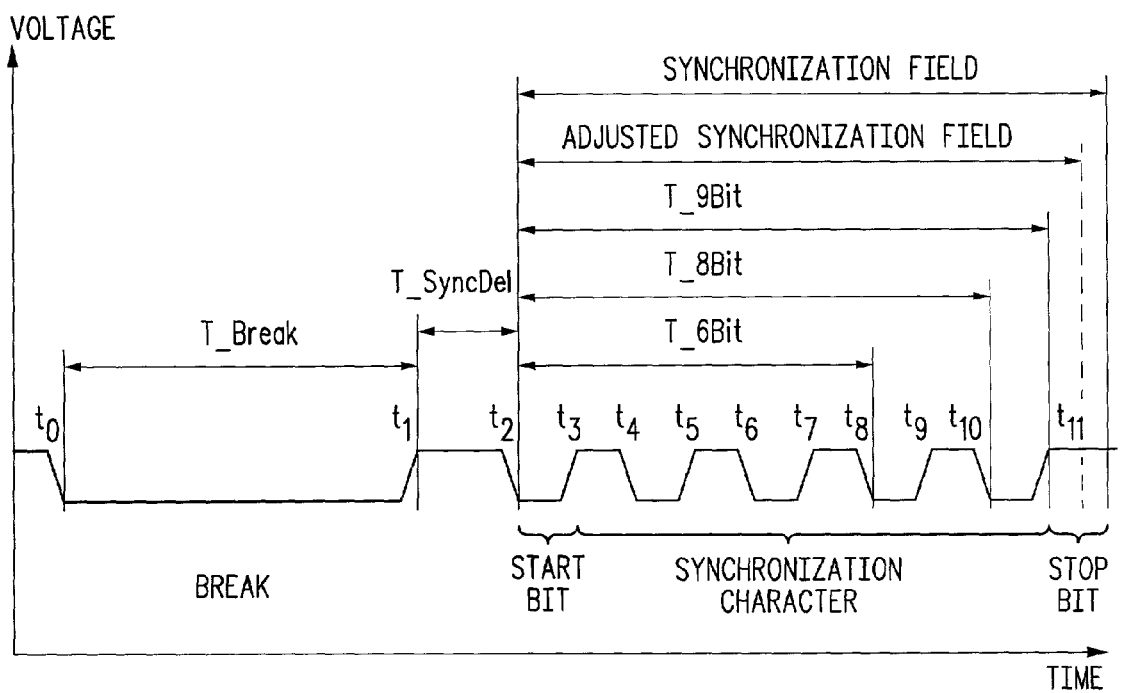
FIG. 3 illustrates, in timing diagram form, a break and synchronization field according to one embodiment of the present invention.

FIG. 3 illustrates, in timing diagram form, the transmission of a break character and a synchronization field on a communication bus such as LIN bus 132, to be received by a slave device. The rising and falling edges are defined by t0, t1, t2 . . . t11. Due to the physical layer interfaces, the rising and falling edges may have varying slew rates, as described above. The break character (or SOF symbol) is defined by the time period between falling edge t0 and rising edge t1, which is referred to as T_Break. Note that in this embodiment and in the flow diagram of FIG. 4, the break character is assumed to include 10 or more dominant zero bits rather than 13 or more dominant zero bits. Note also that the time between a falling edge and a subsequent rising edge may also be referred to as a dominant zero or a dominant pulse. Following the break character is a time delay, T_SyncDel, defined by the delay between rising edge t1 and falling edge t2. This may also be referred to as the synchronization break delimiter. Note also that the time between a rising edge and a subsequent falling edge may also be referred to as a recessive one or a recessive pulse.

Following T_SyncDel is the synchronization field which includes ten bits: a start bit, a synchronization character (having eight bits), and a stop bit. The start bit is defined by the falling edge t2 and the rising edge t3, the synchronization character is defined by the rising edge t3 and the rising edge t11, and the stop bit is defined by the rising edge t11 and lasts for a duration equivalent to one bit. The LIN specification defines the start bit as always being low and the stop bit as always being high. The values T_6Bit, T_8Bit, and T_9Bit refer to various time values measured within the synchronization field. For example, T_6Bit is the time between the falling edge t2 and the falling edge t8, and is equivalent to the transmission time of 6 bits, with each pulse (e.g. t2 to t3, t3 to t4, t4 to t5, etc.) corresponding to one bit. The adjusted synchronization field refers to 9.5 bit times. This is equivalent to T_9Bit, compensated by a sampling correction value, which, in one embodiment, is equivalent to half the period of the stop bit. This corresponds to a standard UART which samples a stop bit in the middle of the pulse, therefore providing for a sampling correction value of half a pulse. (In alternate embodiments, the sampling correction value can be defined as less than or equal to 1/(4×baud-rate).) Also note that T_9Bit is defined between the falling edge of t2 and the rising edge of t11. The use of both the falling and rising edge to define T_9Bit improves the accuracy of the adjusted synchronization field measurement by helping compensate for the difference in slew rates between the falling and rising edges, the propagation delays, the threshold voltages of the physical layer interface, the distributed time constants, and the ground/voltage supply shift voltages of the medium. Operation of FIG. 3 will further be described in reference to the flow diagram of FIG. 4.

Figure 4:
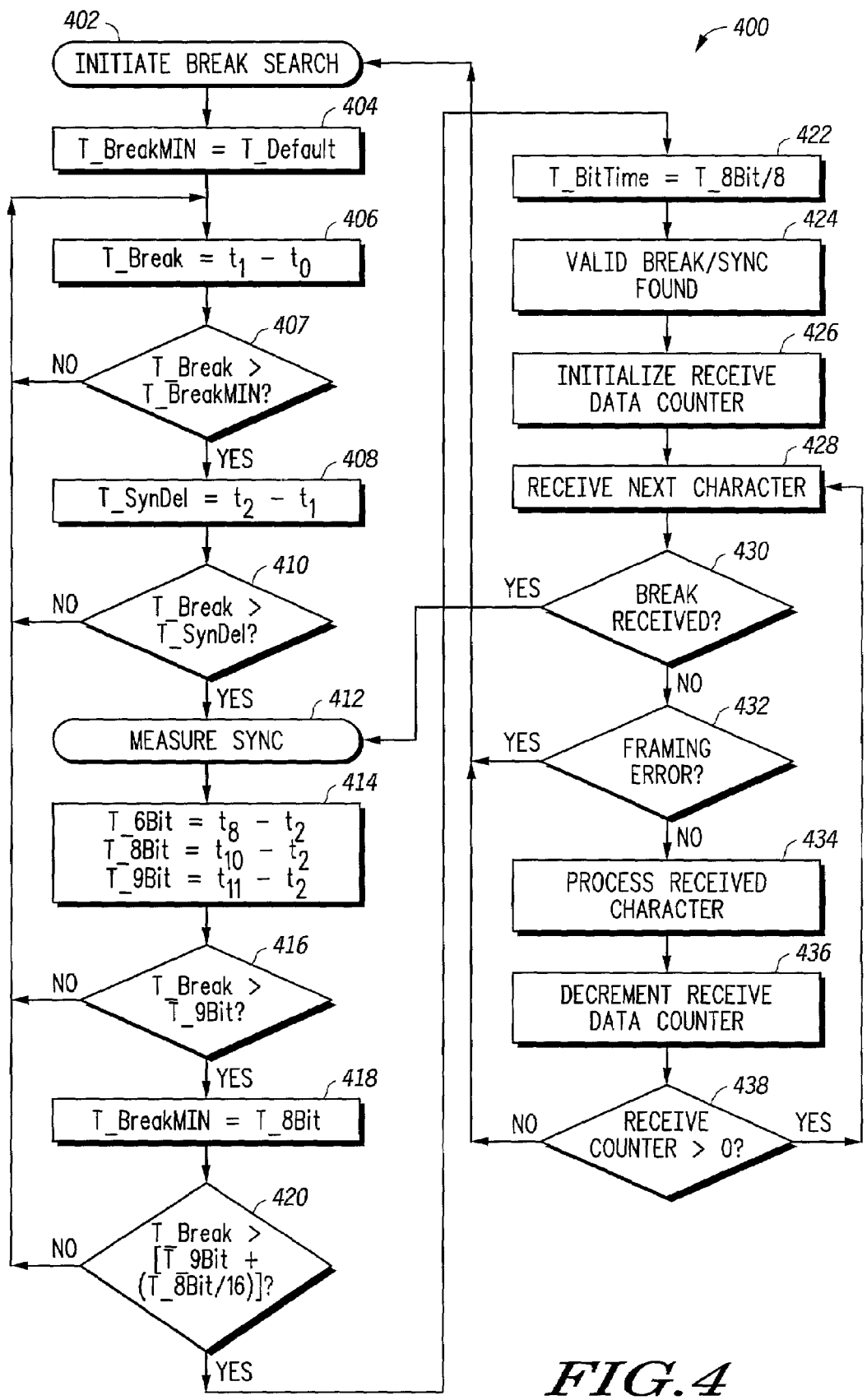
FIG. 4 illustrates, in flow diagram form, a method of operating a serial communication bus according to one embodiment of the present invention.

FIG. 4 illustrates operation of a communication bus by a slave node in a communication system. Flow 400 begins with block 402 where a break search is initiated. At this point, the communication bus (e.g. LIN bus 132) is idle. That is, no communication is currently taking place. Upon detection of a falling edge, T_BreakMIN is set to a default value, T_Default. In an embodiment utilizing the LIN protocol, this T_Default value is representative of the smallest break possible under the LIN protocol. T_Default may therefore be calculated as the time of 8 bits at the maximum baud-rate specified by the LIN specification (20K baud nominal) with the worse case RC oscillator frequency for the specific slave node implementation. This value may, for example, be derived at design time. This value is later updated with an actual 8 bit period (T_8Bit) measured at a later point (block 418). Alternate embodiments, such as those outside the LIN protocol, may define other maximum baud-rates thus giving different T_Default values.

Flow then continues to block 406 where T_Break is set equivalent to the time between falling edge t0 and rising edge t1. In a stream of data, this represents the next potential break character. Further processing is performed to determine if a valid break was actually received. Flow then continues to decision diamond 407 where the duration of the break pulse is compared against the minimum break (T_BreakMIN) that was determined in either block 404 or block 418. This comparison immediately discards a period that is too short for further processing and allows a next low period (i.e. a next potential break character) to be detected. If T_Break is not greater than T_BreakMIN, the break is invalid and flow continues to block 406 where T_Break is recalculated upon the receipt of a next falling edge. However, if at decision diamond 407, T_Break is greater than T_BreakMIN, thus surpassing a minimum threshold, flow continues to block 408 where a delay, T_SyncDel, is calculated as t2 minus t1. Flow continues to decision diamond 410 where it is determined whether T_Break is greater than T_SyncDel (for a LIN frame, T_Break should be greater than T_SyncDel, thus providing another check on the validity of the detected break character). If not, T_Break is determined to be invalid and flow returns to block 406 where T_Break will be calculated upon the receipt of a next falling edge. However, if T_Break is determined to be greater than T_SynDel, processing continues with block 412 where synchronization field measurements are begun.

In block 414, the values for T_6Bit, T_8Bit, and T_9Bit are calculated. Each is calculated with reference to the first falling edge, t2, of the synchronization field. The calculations of block 414 also help to determine whether the sync character is valid. The LIN specification, as discussed above, defines the sync character as $55 which provides for a series of 5 falling edges (e.g. t2, t4, t6, t8, and t10 of FIG. 3). Therefore, if 5 falling edges are not detected, the sync character is invalid. The calculations of block 414 require the use of edges up to t11, thus providing the opportunity to verify that 5 falling edges are received.

Flow then continues to decision diamond 416 where it is determined whether T_Break is greater than T_9Bit. If not, flow returns to block 406 where T_Break is calculated upon the receipt of a next falling edge. If T_Break is determined to be greater than T_9Bit, then processing continues with block 418 to continue determination of whether the break/sync pair is valid. At block 418, T_BreakMIN is updated with T_8Bit which corresponds to the duration of 8 bit pulses. Therefore, the comparison of decision diamond 407 is made against the 8 bit period of the previous frame until a new break search is initiated at block 402. Flow then continues to decision diamond 420 where it is determined whether T_Break is greater than the adjusted synchronization field (e.g. T_9Bit+T8Bit/16). T_8Bit divided by 16 provides the sampling correction value, which, in this embodiment, is equivalent to half of a pulse period. This half a pulse value added to T_9Bit provides the length of the adjusted synchronization field which corresponds to the duration of 9.5 bit pulses. A break character is therefore valid if it is greater than 9.5 bit pulses, just as would be detected by a standard UART/SCI circuit.

If T_Break is greater than the adjusted synchronization field value, flow continues to block 422 where T_BitTime is set to T_8Bit/8. Therefore, bit timing information can be extracted from the synchronization character to derive the system baud-rate, and the unique break/sync pair sequence is confirmed to positively identify the start of a new frame as illustrated by block 424. Once a valid break/sync pair is found, flow continues to block 426 where a receive data counter is initiated. This counter is initialized to the maximum allowable number of bytes to be transmitted at any given time within the communication system. This counter acts as a watchdog counter to prevent run away processes from causing the loss of synchronization.

Flow then continues to block 428 where a character within the data field is received. Flow continues to decision diamond 430 where it is determined whether a break was received rather than a data character. At this point, since the system is synchronized, a break is detected as a zero character followed by an invalid stop bit. This is the standard UART/SCI break detection method. A break is effectively comprised of a series of zeros without the high stop bit included at the end of all the characters. Therefore, breaks can be detected as a zero character having an invalid stop bit. If a break is detected, flow returns to block 412 where a synchronization character is once again expected (following the received break). The received data counter is cleared and the previous received data is discarded. If a break is not received at decision diamond 430, flow continues to decision diamond 432 where framing errors, if any, are detected. These framing errors could include any protocol specific framing errors. If a framing error is detected, it is assumed that an error in the data exists and a break (or SOF symbol) search is reinitiated at block 402. However, if no framing errors are detected flow continues to block 434 where the received character is processed. For example, this processing may include storing the values for future use by the receiving device. Flow then continues to block 436 where the received data counter is decremented. If the receive data counter has decremented down to zero, then the maximum allowable number of bytes has been transmitted and the system is assumed to have run out of control. Therefore, flow returns to block 402 where a new break (or SOF symbol) search is initiated. However, if the receive counter is still within its allowable range, that is, still greater than zero, flow returns to block 428 where the next character is received. Flow can then follow through, as discussed above, through decision diamonds 430 and 432 and blocks 434 and 436

In the flow of FIG. 4, a new break (or SOF symbol) search is initiated upon certain events. In some embodiments, a break search is initiated upon reset, power-up, waking up from a sleep mode, or the like. Otherwise, once the slave node is synchronized, the baud-rate is known and a break can be detected as a zero character followed by an invalid stop bit. Note that this also applies to the flow of FIG. 6 (e.g. blocks 602 and 628), as will be discussed further below.

As discussed above, T_9Bit is defined between the falling edge of t2 and the rising edge of t11 which improves the accuracy of the adjusted synchronization field measurement due to the difference in slew rates between the falling and rising edges. Alternate embodiments may use any combination of pulse durations between rising and falling edges to achieve this improved accuracy; however, the use of the T_9Bit also allows the slave node to check for the receipt of 5 falling edges which is characteristic of the synchronization character $55. The detection of the 5 falling edges of the synchronization character ensures that the synchronization character being received is valid. Otherwise, if not all 5 falling edges are detected, a system may determine that a synchronization character is valid when it may not be. Therefore, the detection of the 5 falling edges used in calculating T9 bit provides another check on the validity of the synchronization character. However, alternate values may be used to achieve the improved accuracy due to the varying slew rates of the rising and falling edges. For example, a measurement may be taken from the falling edge of t2 to the rising edge of t5 to obtain T_3Bit. This can then be multiplied by 3 and added to the sampling correction value to also provide the value of 9.5 bits; however, it is possible that the rising edge of t5 may not be followed by three more falling edges thus indicating an invalid synchronization field even though an adjusted synchronization field value is calculated. Alternate embodiments may not use both the rising and falling edges to obtain a measurement and therefore, may use any combination of measurements to calculate the length of the adjusted synchronization field. Also, the sampling correction value maybe something other than half a bit-length depending on the embodiment. For example, it can be defined as being less than or equal to 1/(4×baud-rate). Alternate embodiments may also utilize other synchronization characters other than $55 to provide similar results.

Figure 5:
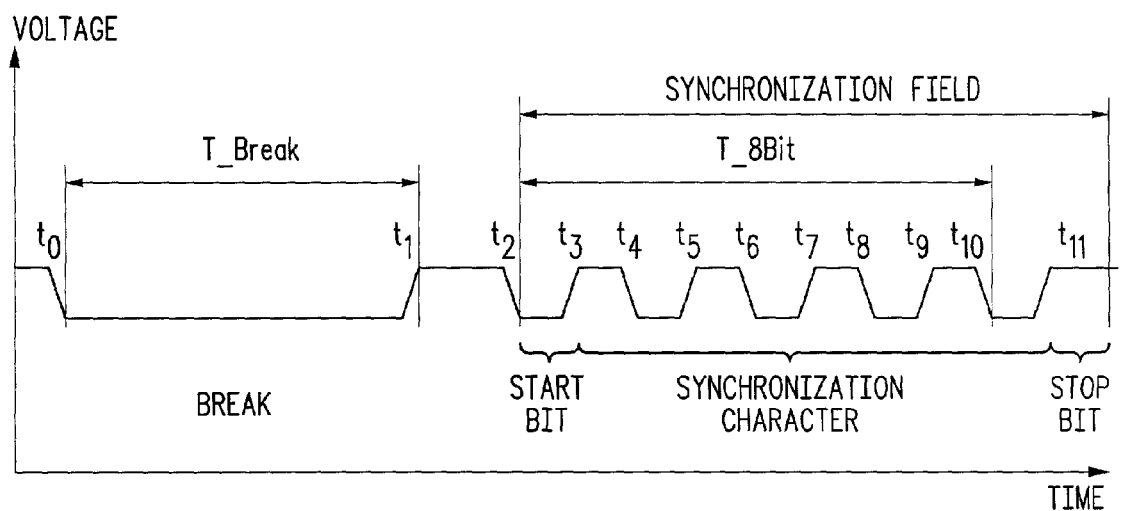
FIG. 5 illustrates, in timing diagram form, a break and synchronization field in accordance with an alternate embodiment of the present invention.
Figure 6:
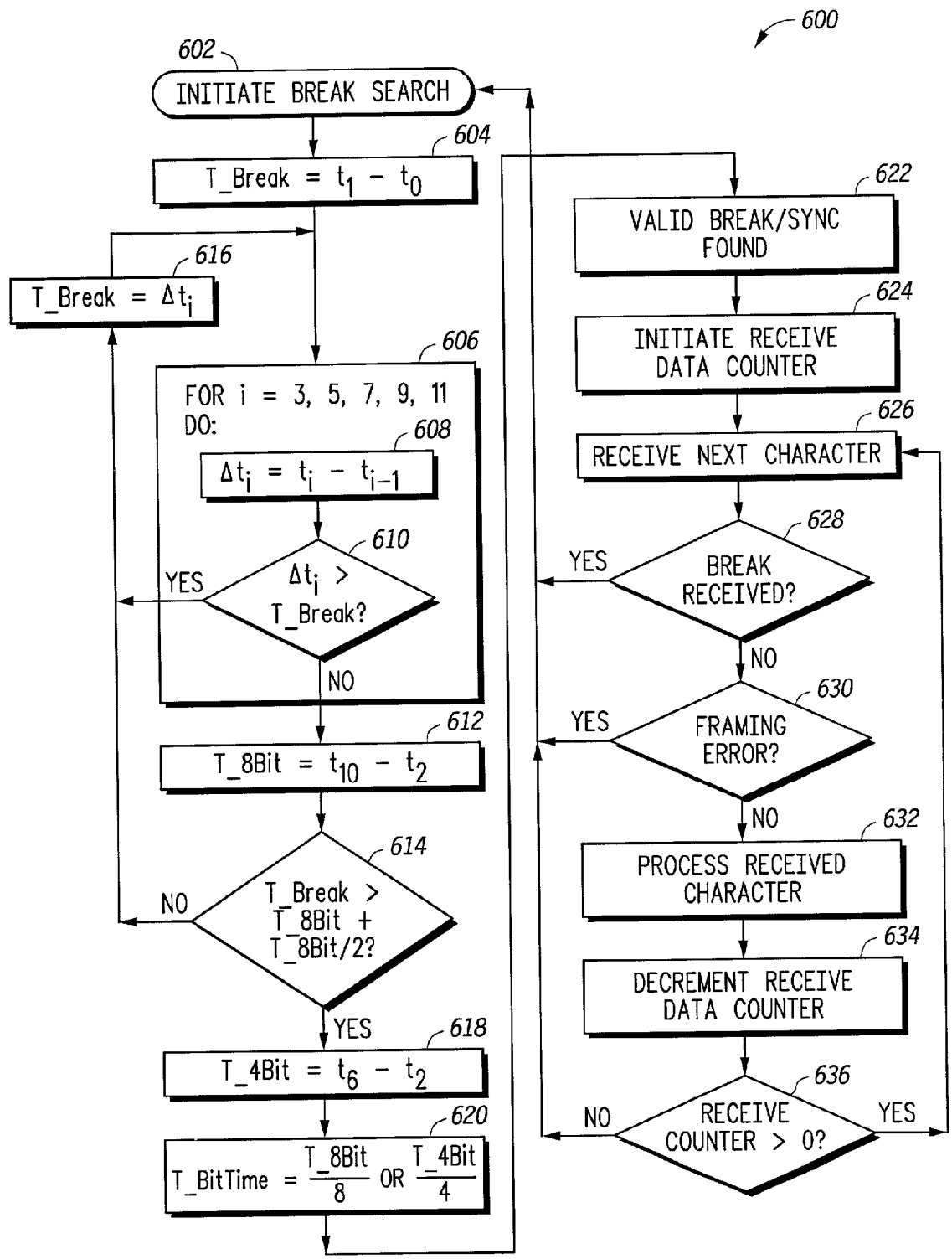
FIG. 6 illustrates in flow diagram form, a method of operating a serial communication bus in accordance with an alternate embodiment of the present invention.

FIG. 5 is similar to FIG. 3; however, the embodiments of FIGS. 5 and 6 assume a break character of 13 or more dominant zero bits rather than 10 or more. Operation of the timing diagram of FIG. 5 can be better understood in reference to the flow diagram of FIG. 6. Note that blocks 622 through 636 of FIG. 6 function in the same manner as blocks 424 through 438 of FIG. 4. However, FIG. 6 offers an alternate embodiment for seeking a valid break/sync pair, assuming a break character of 13 or more dominant zero bits. In block 602 a break search is initiated. (As mentioned above, a break search may be initiated upon, for example, reset, power-up, waking up from sleep-mode, or the like, or by detecting a break at decision diamond 628.) Flow continues to block 604 where T_Break is set to the dominant period (i.e. low period) between t0 and t1. Therefore, it is assumed that the first low period between falling edge t0 and rising edge t1 is a break or SOF symbol. Block 606 is then performed five times for i=3, 5, 7, 9 and 11. In block 606, the period for each subsequent dominant or low period is checked against the previous break value, T_Break. That is, block 608 evaluates the next low period, $\Delta t_i$, which, for the first iteration, is equivalent to the difference between the falling edge t2 and the rising edge t3 (i.e. $\Delta t_3 = t_3 - t_2$). Flow then continues to decision diamond 610 which determines whether the subsequent low period (e.g. $\Delta t_3$) is greater than T_Break. If so, T_Break is set to this new value in block 616 and flow is returned to the top of block 606. This indicates that the previous T_Break (set initially in block 604) is invalid since T_Break should be the longest dominant or low period. If the duration of the next low period (e.g. $\Delta t_3$) is not greater than T_Break, the calculations at block 608 and 610 are repeated for i=5, 7, 9 and 11. If, at any of these i values, a low period is found to be greater than the current break, T_Break, T_Break is reset at block 616 and flow is returned to block 606 where i is once again set to 3. However, if block 606 is performed for each of i=3, 5, 7, 9 and 11 and decision diamond 610 always resulted in no, the final flow flows from block 606 to block 612. This indicates that no low period was found to be greater than T_Break and five subsequent falling edges were detected following the break (one falling edge corresponding to each of i=3, 5, 7, 9, and 11). This indicates a valid break character followed by a synchronization field.

In block 612, T_8Bit is calculated as the time between falling edge t2 and falling edge t10. Flow then continues to block 614 where the value of T_8Bit+T_8Bit/2 is calculated. This value gives the equivalent of the period of 12 bits. Therefore, by comparing the length of the break (T_Break) with the calculated 12 bit value, a valid break/sync pair can be detected. Therefore, if T_Break is greater than T_8Bit+T_8Bit/2, flow continues to 618 where T_4Bit is calculated as the time between edge t2 and edge t6. This is then used to calculate T_BitTime in block 620. Alternatively, T_BitTime can be calculated using T_4Bit/4, or other calculations. T_BitTime can therefore be used to determine the baud-rate of the master. As discussed above, flow continues to block 622, where blocks 622–636 operate as blocks 424–438 of FIG. 4.

It can therefore be appreciated how comparisons between the synchronization character and break character allow for automatic baud-rate detection and synchronization by a slave node without requiring prior knowledge of a master's baud-rate. The methods of FIGS. 4 and 6 can also be implemented in hardware, software, or a combination of both. Likewise, one of ordinary skill in the art can appreciate that the serial logic within the master/slave devices can include, for example, hardware state machines, random logic, embedded software, etc.

While the above embodiments were described mostly in reference to the LIN protocol, they may be used in various other communication systems other than those defined by LIN. For example, embodiments may include a method for operating a communication bus which includes detecting a start of frame symbol on the communication bus; determining a length of the start of frame symbol; detecting a start of a synchronization field on the communication bus; determining a length of an adjusted synchronization field; determining if the length of the adjusted synchronization field is less than the length of the start of frame symbol; and if the length of the adjusted synchronization field is less than the length of the start of frame symbol, concluding that the start of frame symbol is valid and concluding that the synchronization field is valid.

Although the invention has been described with respect to specific conductivity types or polarity of potentials, skilled artisans appreciated that conductivity types and polarities of potentials may be reversed. Also, while dominant periods have been shown as low periods, alternate embodiments may use high dominant periods.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for operating a communication bus, comprising the steps of:
    detecting a start of frame symbol on the communication bus;
    determining a length of the start of frame symbol;
    detecting a start of a synchronization field on the communication bus;
    determining a length of an adjusted synchronization field;
    determining if the length of the adjusted synchronization field is less than the length of the start of frame symbol; and
    if the length of the adjusted synchronization field is less than the length of the start of frame symbol, concluding that the start of frame symbol is valid and concluding that the synchronization field is valid.

2. The method as in claim 1, wherein the step of determining a length of the adjusted synchronization field comprises steps of:
    detecting a first failing edge; and
    detecting a rising edge.

3. The method as in claim 1, wherein the step of determining a length of the adjusted synchronization field comprises steps of:
    detecting a falling edge of a start bit; and
    detecting a rising edge of a stop bit.

4. The method as in claim 3, wherein the step of determining a length of the adjusted synchronization field further comprises steps of:
    determining a first time value between the falling edge of the start bit and the rising edge of the stop bit; and
    calculating the length of the adjusted synchronization field by adding a sampling correction value to the first time value.

5. The method as in claim 4, wherein the step of calculating the length of the adjusted synchronization field comprises steps of:
    determining a second time value between the falling edge of the start bit and a subsequent falling edge; and
    calculating the sampling correction value by dividing the second time value by a predetermined number, where the predetermined number is a power of two.

6. The method as in claim 5, wherein the subsequent falling edge is a third falling edge after the falling edge of the start bit, and the predetermined number is sixteen.

7. The method as in claim 5, wherein the communication bus has a baud rate, and wherein the sampling correction value is less than or equal to 1/(4×baud rate).

8. The method as in claim 5, further comprising:
    determining a baud rate of the communication bus using the second time value.

9. The method as in claim 1, wherein the step of determining a length of the adjusted synchronization field further comprises steps of:
    determining a time value between a first falling edge and a subsequent falling edge;
    calculating a correction value by dividing the time value by a predetermined number, where the predetermined number is a power of two; and
    calculating the length of the adjusted synchronization field by adding the correction value to the time value.

10. The method as in claim 9, wherein the predetermined number is two.

11. The method as in claim 9, wherein the subsequent falling edge is a fifth falling edge.

12. The method as in claim 11, further comprising:
    determining a baud rate of the communication bus using the time value.

13. The method as in claim 1, further comprising:
    determining a baud rate of the communication bus.

14. The method as in claim 13, further comprising:
    after determining the baud rate of the communication bus, receiving at least one character associated with said start of frame.

15. The method as in claim 7, wherein the communication bus is a serial communication bus.

16. The method as in claim 8, wherein the communication bus uses a character-oriented protocol.

17. The method as in claim 9, wherein the character-oriented protocol is a Local Interconnect Network (LIN) protocol.

18. An apparatus for operating a communication bus, the apparatus comprising:
    means for detecting a start of frame symbol on the communication bus;
    means for determining a length of the start of frame symbol;
    means for detecting a start of a synchronization field on the communication bus;
    means for determining a length of an adjusted synchronization field;
    means for determining if the length of the adjusted synchronization field is less than the length of the start of frame symbol; and
    means for determining if the length off the adjusted synchronization field is less than the length of the start of frame symbol, and if it is, concluding that the start of frame symbol is valid and concluding that the synchronization field is valid.

19. The apparatus as in claim 18, further comprising:
means for determining a baud rate of the communication bus.

20. The apparatus as in claim 18, wherein the communication bus is a serial bus which uses a character-oriented protocol.

21. An apparatus for operating a communication bus, the apparatus comprising:
circuitry operable for detecting a start of frame symbol on the communication bus;
circuitry operable for determining a length of the start of frame symbol;
circuitry operable for detecting a start of a synchronization field on the communication bus;
circuitry operable for determining a length of an adjusted synchronization field;
circuitry operable for determining if the length of the adjusted synchronization field is less than the length of the start of frame symbol; and
circuitry operable for determining if the length of the adjusted synchronization field is less than the length of the start of frame symbol, and if it is, concluding that the start of frame symbol is valid and concluding that the synchronization field is valid.

* * * * *

UNITED STATES PATENT AND TRADEMARK OFFICE
CERTIFICATE OF CORRECTION

| | |
|---|---|
| PATENT NO. | : 6,959,014 B2 |
| APPLICATION NO. | : 09/773806 |
| DATED | : February 1, 2001 |
| INVENTOR(S) | : Aldan J. Pohlmeyer |

It is certified that error appears in the above-identified patent and that said Letters Patent is hereby corrected as shown below:

In Column 9, Line 51, Claim No. 2:
    Change "detecting a first failing edge; and" to --detecting a first falling edge; and--

In Column 10, Line 63, Claim No. 18:
    Change "means for determining if the length off the adjusted" to --means for determining if the length of the adjusted--

Signed and Sealed this

Tenth Day of June, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,959,014 B2 | Page 1 of 1 |
| APPLICATION NO. | : 09/773806 | |
| DATED | : October 25, 2005 | |
| INVENTOR(S) | : Aldan J. Pohlmeyer | |

It is certified that error appears in the above-identified patent and that said Letters Patent is hereby corrected as shown below:

In Column 9, Line 51, Claim No. 2:
    Change "detecting a first failing edge; and" to --detecting a first falling edge; and--

In Column 10, Line 63, Claim No. 18:
    Change "means for determining if the length off the adjusted" to --means for determining if the length of the adjusted--

This certificate supersedes the Certificate of Correction issued June 10, 2008.

Signed and Sealed this

Fifteenth Day of July, 2008

JON W. DUDAS
*Director of the United States Patent and Trademark Office*